United States Patent [19]

LaForce

[11] Patent Number: 4,491,716
[45] Date of Patent: Jan. 1, 1985

[54] METHOD AND APPARATUS FOR EQUILIZING TEMPERATURE OF PIPE SECTIONS DURING SOLID PHASE WELDING

[75] Inventor: Jean LaForce, P.O. Box C, Inverness, Calif. 94937

[73] Assignees: Carl Stringer; Stringer Oil & Gas Co.; Jean LaForce; Carl Thomas Stringer, all of San Angelo, Tex.

[21] Appl. No.: 181,130

[22] Filed: Aug. 25, 1980

[51] Int. Cl.³ .............................................. B23K 9/02
[52] U.S. Cl. .................................... 219/101; 219/59.1
[58] Field of Search ................ 219/67, 122, 101, 59.1; 228/44.1, 59

[56] References Cited

U.S. PATENT DOCUMENTS

| Re. 28,190 | 10/1974 | LaForce | 219/67 |
| 1,638,336 | 8/1927 | Himes | 219/122 X |
| 1,915,913 | 6/1933 | Anderson | 228/59 |
| 1,933,133 | 10/1933 | Anderson | 228/59 |
| 3,838,243 | 9/1974 | Inagaki | 219/122 |

Primary Examiner—Roy N. Envall, Jr.
Assistant Examiner—Alfred S. Keve
Attorney, Agent, or Firm—Harris Zimmerman; Howard Cohen

[57] ABSTRACT

In solid phase or pressure welding of adjacent pipe ends wherein a burner ring or other heating element extends circumferentially around the pipes adjacent the joint therebetween, an axial flow of air is directed along the pipe adjacent the weld zone whereby the adjacent pipe ends may be more uniformly heated and thereby produce a better weld.

4 Claims, 4 Drawing Figures

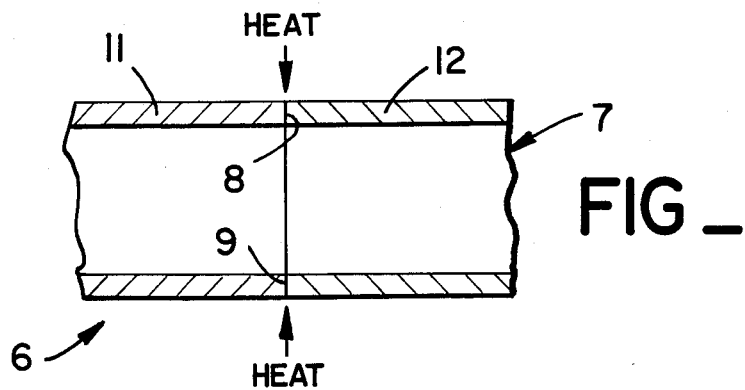
FIG_1
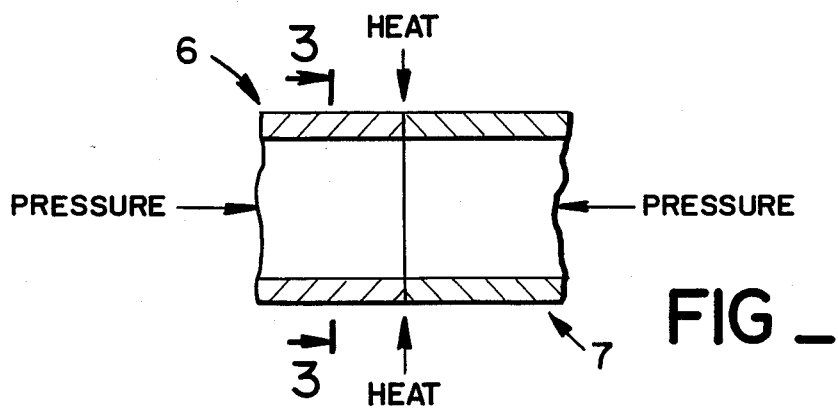
FIG_2
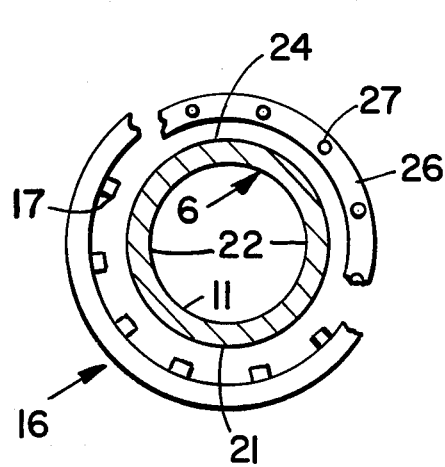
FIG_3
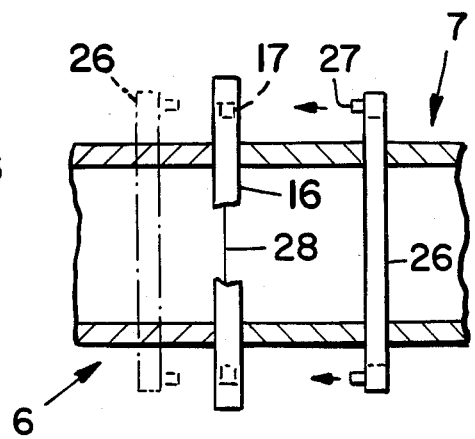
FIG_4

METHOD AND APPARATUS FOR EQUILIZING TEMPERATURE OF PIPE SECTIONS DURING SOLID PHASE WELDING

BACKGROUND OF THE INVENTION

The art of solid phase welding or pressure welding, particularly as applied to the joining of adjacent pipe ends, is described and disclosed in U.S. Pat. No. Re. 28,190 of Oct. 8, 1974. In said patent, there is provided a method of solid phase welding of pipes wherein two horizontally disposed pipes are positioned in axial alignment with their adjacent ends placed in contiguous relation, and axial upsetting pressure is applied to the abutting ends while heat is applied thereto. The heat is applied externally of the pipe, preferably by the use of a generally annular burner ring which circumscribes the pipes at their confronting ends. The ring has a number of radially inwardly directed burner jets or nozzles through which a combustible oxyacetylene flame is directed to the joint to be welded.

Most pipes, particularly those on lengthy pipe lines, are welded in place, and consequently are welded in a horizontal position. Application of heat to the circumferential joint thus presents a problem because of the fact that heat rises, so that even though one attempts to apply uniform heat around the pipe ends, the lower or under portion of the pipes will be brought to an elevated temperature faster than the upper portions of the pipes, and an undesirable temperature gradient is produced from bottom to top of the pipes.

It has been suggested that this problem can be overcome by providing different jet openings and/or spacing between adjacent jets or nozzles so that a greater amount of heat will be applied to the otherwise cooler upper portions of the pipes. This is not only far more expensive than providing a simple ring with standard size jet nozzles, but also presents substantial engineering design problems which vary according to the diametrical size of the pipes being welded.

SUMMARY OF THE INVENTION

In accordance with the teachings of the present invention, adjacent horizontal pipe sections are welded by application of external heat and axial pressure, in which means are provided for causing the pipe ends at their contiguous portions to be uniformly heated in much the same manner as if the pipes were disposed in vertically axially stacked relation. More particularly, such heat control is provided by controlling the flow of air at the weld joint whereby the heat differential updrafts will be caused to flow laterally in much the same manner as if the pipes were vertical. The control as here shown takes the form of a plurality of air jets directed axially around the periphery of the pipes adjacent the heated fusion zone whereat the external annular burner ring is directing heat radially inwardly toward the pipe ends.

Alternatively, the air jets may be arranged so that the jets suck air from the weld joint rather than blowing air past the weld joint to accomplish the same effective air movement and the same desired result.

BRIEF DESCRIPTION OF THE DRAWING

FIG. 1 is a cross-sectional view of two sections of horizontal pipe in confronting relation with heat being applied thereto preparatory to a solid phase welding operation.

FIG. 2 is a view similar to FIG. 1, and diagramatically illustrating the application of axial upsetting pressure to urge the pipe sections together.

FIG. 3 is a transverse cross-sectional view through the pipe adjacent the joint, taken in the plane 3—3 of FIG. 2, and diagramatically illustrating a portion of the burner ring and the air flow control ring.

FIG. 4 is a longitudinal cross-sectional view showing the position of the air flow control ring relative to the application of heat and the pipe joint.

DETAILED DESCRIPTION OF THE INVENTION

FIGS. 1 and 2 diagramatically illustrate a typical method of solid phase welding of two pipe sections 6 and 7. As explained in greater detail in U.S. Pat. No. Re. 28,190, such a method includes the placing of the end wall surface 8 of pipe 6 adjacent to end wall surface 9 of pipe 7, applying heat around the outer peripheral surfaces of the respective pipe walls 11 and 12, and applying axial pressure or loading, forcing ends 8 and 9 toward each other while under heat to effect the pressure weld.

The foregoing is illustrative of pressure welding of pipes as described in my aforesaid U.S. Pat. No. Re. 28,190. As further described in said patent, because of the fact that the bores of the pipes are filled with pipe grasping and aligning equipment, as well as for other reasons, all of the heat required for welding the pipe ends is applied externally, such as by the use of an annular burner ring 16 which circumferentially encircles the pipe sections adjacent the end walls 8, 9. Burner ring 16 is provided with a plurality of radially inwardly directed flame nozzles or jets 17 spaced generally equally about the circumference of the pipes adajcent their confronting faces or walls 8 and 9 and which direct oxyacetylene flames or the like against the pipe ends sufficient to raise the joint temperature sufficiently to effect the weld.

As previously mentioned, because of the fact that heat rises, the pipes will be hotter at their bottom portions 21, somewhat cooler at their midportions 22, and coolest at their upper portions 24. This uneven application of heat will not produce the most desirable pressure weld.

To correct this temperature gradient to a relatively uniform application of heat, there is provided means for controlling air flow and heating action so that the temperature gradient updraft will be converted into a lateral or horizontal movement in a manner similar to that if the pipe ends were heated with the pipes in a vertical stacked relationship.

As seen in FIGS. 3 and 4, an annular air ring 26 circumferentially encircles one of the pipes, e.g. pipe section 7, with air jet nozzles 27 directed axially or horizontally towards the adjacent burner ring 16 or other heat source, which encircles the weld joint 28. The air directed along the pipe tends to move the heated air horizontally along the pipe, as above explained. In some instances, the air ring 26 may be positioned on the other side of the joint 28, as shown in phantom lines, with the jet nozzles 27 effecting a suction of air adjacent and past joint 28.

Also, in some cases, it may be desirable to only effect air movement along, for example, the lower portion of the pipes, and in such event, the uppermost air jet nozzles may be closed or completely eliminated.

I claim:

1. In the method of solid phase welding of a first horizontally disposed pipe section to a second horizontally disposed pipe section wherein confronting faces of the two sections are brought into contiguous confronting relationship to define a joint lying in a generally vertical plane and external heat is applied in a generally vertical plane to said pipe sections adjacent to said first vertical joint substantially equally and uniformly around the periphery thereof, and axial pressure is applied to said sections urging said faces toward each other; the improvement comprising directing a stream of air in a horizontal direction and parallel to the axes of said sections substantially uniformly around at least a portion of one of said pipe sections with said air being adjacent to and moving past said joint and said external heat is moved across said joint to cause said pipe sections to be uniformly heated.

2. The method of claim 1 in which said heat is applied by means of radially inwardly directed flames of equal size substantially equally circumferentially spaced around said pipe sections.

3. The method of claim 2 in which said flames are generally disposed adjacent said joint, and said air is moved by a plurality of jets of air around one of said pipe sections, and causing said heat to move horizontally from said flames toward said joint.

4. The method of claim 1 in which said air is moved substantially uniformly around the entire periphery of one of said pipe sections.

* * * * *